(12) United States Patent
Ito et al.

(10) Patent No.: US 9,069,565 B2
(45) Date of Patent: Jun. 30, 2015

(54) PROCESSOR AND CONTROL METHOD OF PROCESSOR

(75) Inventors: Toshiro Ito, Kawasaki (JP); Takashi Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 512 days.

(21) Appl. No.: 13/597,322

(22) Filed: Aug. 29, 2012

(65) Prior Publication Data

US 2013/0080750 A1    Mar. 28, 2013

(30) Foreign Application Priority Data

Sep. 22, 2011    (JP) ................................. 2011-207354

(51) Int. Cl.
*G06F 9/38*        (2006.01)
*G06F 9/32*        (2006.01)
*G06F 9/44*        (2006.01)

(52) U.S. Cl.
CPC ............ *G06F 9/3851* (2013.01); *G06F 9/3806* (2013.01); *G06F 9/3844* (2013.01)

(58) Field of Classification Search
None
See application file for complete search history.

(56) References Cited

U.S. PATENT DOCUMENTS

| | | | |
|---|---|---|---|
| 5,796,998 A | 8/1998 | Levitan et al. | |
| 7,120,784 B2 | 10/2006 | Alexander et al. | |
| 7,360,062 B2 | 4/2008 | Kalla et al. | |
| 7,401,207 B2 | 7/2008 | Kalla et al. | |
| 7,401,208 B2 | 7/2008 | Ward et al. | |
| 7,565,512 B2 | 7/2009 | Hayashi | |
| 7,827,388 B2 | 11/2010 | Ward et al. | |
| 7,877,587 B2 | 1/2011 | Vasekin et al. | |
| 7,954,102 B2 | 5/2011 | Okawara | |
| 8,145,885 B2 | 3/2012 | Kalla et al. | |
| 2003/0005262 A1 | 1/2003 | Kottapalli et al. | |
| 2008/0162904 A1 | 7/2008 | Kalla et al. | |
| 2010/0082952 A1* | 4/2010 | Sunayama .................... 712/234 |

FOREIGN PATENT DOCUMENTS

| | | |
|---|---|---|
| JP | 06-089173 | 3/1994 |
| JP | 2001-005665 | 1/2001 |
| JP | 2004-518183 A | 6/2004 |
| JP | 2004-326752 A | 11/2004 |

(Continued)

OTHER PUBLICATIONS

Extended European Search Report dated Jan. 17, 2013 for corresponding European Application No. 12182156.5.

(Continued)

*Primary Examiner* — Scott Sun
(74) *Attorney, Agent, or Firm* — Fujitsu Patent Center

(57) ABSTRACT

A processor includes: first selectors that select instruction addresses of instructions of a plurality of threads or a branch target address of a branch instruction to be predicted and that output addresses of the plurality of threads; a second selector that selects one of the addresses of the plurality of threads output by the first selectors; a branch prediction circuit that predicts and outputs a branch direction, which indicates whether the branch instruction of the address selected by the second selector is branched, based on the selected address in a first cycle stage and that predicts and outputs the branch target address of the branch instruction to be predicted based on the selected address in a second cycle stage later than the first cycle stage; and a thread arbitration circuit that controls selection of the addresses of the threads by the first selectors and the second selector.

6 Claims, 11 Drawing Sheets

(56) References Cited

FOREIGN PATENT DOCUMENTS

| | | |
|---|---|---|
| JP | 4086808 | 5/2008 |
| JP | 4086809 | 5/2008 |
| JP | 4179555 | 11/2008 |
| WO | 02/06959 A1 | 1/2002 |
| WO | WO-02-06959 A1 | 1/2002 |
| WO | WO-2004/044745 | 5/2004 |

OTHER PUBLICATIONS

Loh, Gabriel H., "Revisiting the Performance Impact of Branch Predictor Latencies," Performance Analysis of Systems and Software, IEEE, Mar. 19-21, 2006, pp. 59-69, XP010910194.
Japanese Office Action mailed Mar. 3, 2015 for corresponding of Japanese Patent Application No. 2011-207354, with Partial English Translation, 4 pages.

* cited by examiner

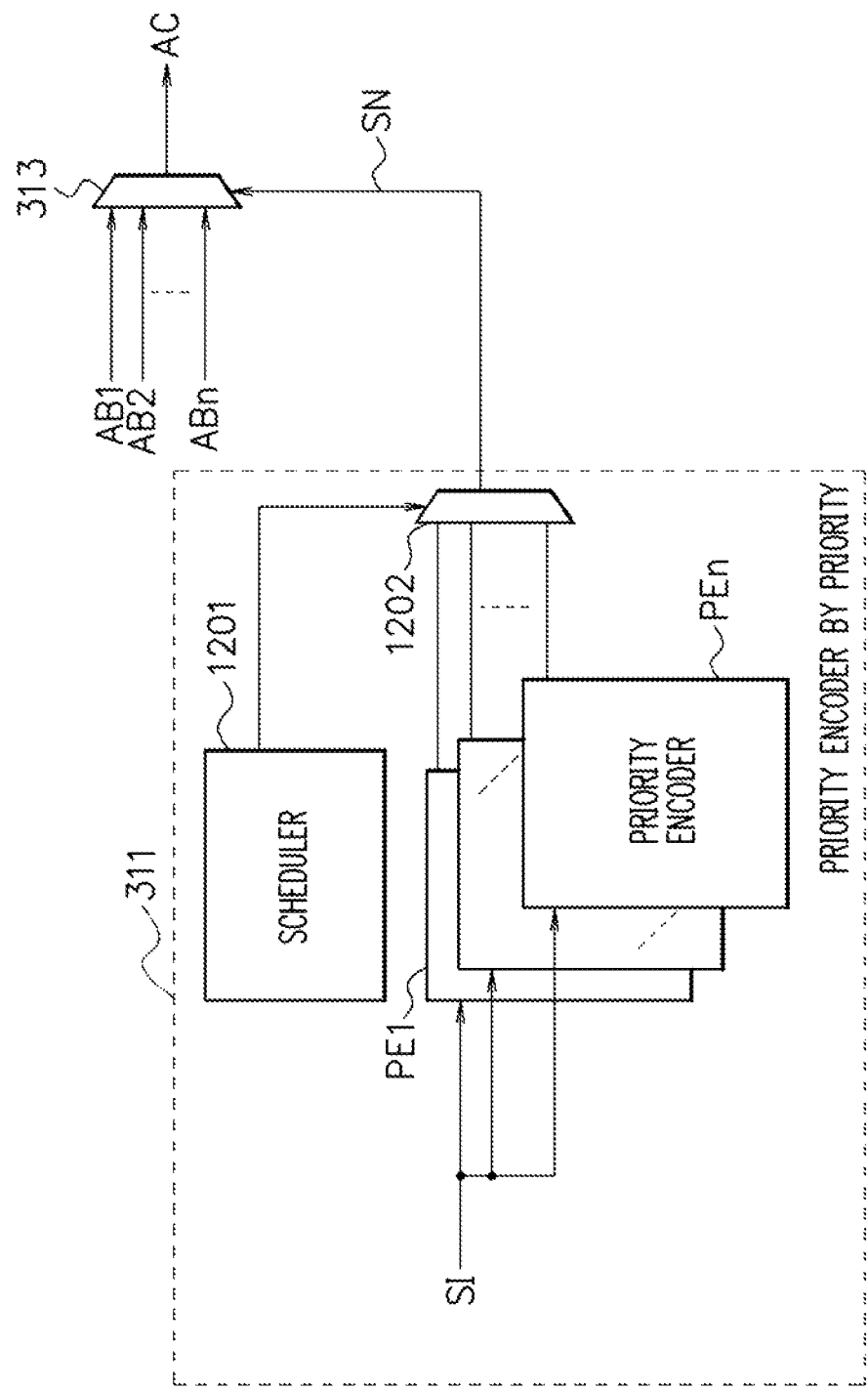

and the priority of the instruction thread have indicated for interleaving and for processing (for example, see Japanese Patent No. 3796124).

PROCESSOR AND CONTROL METHOD OF PROCESSOR

CROSS-REFERENCE TO RELATED APPLICATION

This application is based upon and claims the benefit of priority of the prior Japanese Patent Application No. 2011-207354, filed on Sep. 22, 2011, the entire contents of which are incorporated herein by reference.

FIELD

The present embodiment relates to a processor and a control method of the processor.

BACKGROUND

A pipeline processor as a processor and branch prediction will be described. In a simple implementation of a pipelined processor (pipeline processor), a pipeline is stopped (stalled) in clock cycles of pipeline stages from instruction fetch to branch instruction execution when the branch instruction is executed during execution of a program. The efficiency of the pipeline processing is reduced.

To prevent this, when a branch instruction is fetched, the pipeline processor predicts "taken" if an instruction address of the branch target or a branch direction indicates "branched" and predicts "not taken" if the instruction address or the branch direction indicates "not branched". Alternatively, the pipeline processor predicts both "taken" and "not taken". The pipeline processor generally executes branch prediction processing of continuing the instruction fetch without waiting for the completion of the execution of the branch instruction. As a result of the branch prediction, the processing efficiency of the pipeline can be improved by continuing issuing instructions to the pipeline of the processor.

The branch prediction includes one or both of branch target prediction and branch direction prediction. The branch target prediction denotes prediction of an instruction address of an instruction (branch target instruction) executed after a branch instruction. The branch direction prediction denotes prediction of whether a branch instruction is branched (taken) or not branched (not-taken). An example of a known branch prediction system includes Japanese Laid-open Patent Publication No. 06-89173.

The system of branch prediction includes static branch prediction with low branch prediction latency and with inferior branch prediction accuracy and dynamic branch prediction with high branch prediction latency and with high branch prediction accuracy. In the static branch prediction, for example, a subsequent address is simply read (assumed "not-taken") or a prediction bit on an instruction code is used. In the dynamic branch prediction, a past branch history of executed programs is referenced to use regularity of behaviors of branches of the programs to predict one or both of the branch direction and the branch target instruction address based on a branch instruction that is not completed.

In general, a large-scale history is used in the dynamic branch prediction, and the dynamic branch prediction needs more complicated circuits compared to when the dynamic branch prediction is not used and needs a plurality of clock cycles until the completion of the branch prediction. A failure in the branch prediction significantly reduces the performance and the efficiency of power in a processor core with a large number of pipeline steps and simultaneous executions of instructions. A dynamic branch prediction circuit with high prediction accuracy is generally used in the processor core.

Multithreading will be described. A pipelined system with a plurality of threads in a time-division multiplexing manner has emerged around 1960 to efficiently use a computing unit with a long latency.

In a modern computer system, a memory latency, which is time for memory reading and writing, is higher than an operation latency in the processor. A throughput-oriented processor generally adopts hardware multithreading, which is a multithread processing system based on hardware, to conceal the memory latency to improve the throughput of the processor.

The processor core holds one or more sets of hardware threads (also called "strands") as hardware resources for executing threads, indicating a state of architecture and a state of processor derived from the state of architecture. Therefore, in most cases, the instruction fetch addresses handled in the process by the instruction fetch unit have different values in each thread.

The hardware multithreading is a system in which a single processor core switches a plurality hardware threads in a cycle-by-cycle time division manner or simultaneously processes the plurality of hardware threads within the same cycle.

The definition of hardware threads and multithreading as terms related to micro-architecture and the definition of threads and multithreading as terms in a field related to software, such as an operating system, are usually different. Hereinafter, the meaning described above will be used.

Parallel execution of the instructions of a plurality of threads improves the use efficiency of the computing unit between the plurality of threads or realizes parallel (overlapped) usage of the memory access and the computing unit between the plurality of threads. Therefore, the throughput of the processor improves.

A processor (multithread processor) that processes a plurality of threads by hardware to process the plurality of threads in parallel generally fetches instructions by switching the target threads cycle-by-cycle at a stage of instruction fetch. The time unit of switching the threads for fetching is one clock cycle at the minimum, and there is also a system with larger temporal granularity. The former is generally called FGMT (Fine-grained multithreading) or the like, and the latter is called VMT (Vertical multithreading), CGMT (Coarse-grained multithreading), or the like.

An example of a system of switching the threads (thread scheduling) of the instruction fetch unit includes a round-robin system. This is a method of switching the scheduled threads in a predetermined order in each cycle.

There is also a known data processor that processes a plurality of interleaved instruction threads in cycles according to a priority rule and that adjusts the priority allocated to a specific instruction thread based on an event or a condition related to the instruction threads (for example, see Japanese Patent No. 4179555).

There is also a known data processor that processes a plurality of interleaved instruction threads in cycles according to a priority rule and that executes processing based on an event or a condition related to the instruction threads to select a specific instruction thread (for example, see Japanese Patent No. 4086808).

There is also a known processor capable of processing a plurality of instruction threads, wherein randomization is implemented in a method of interleaving instruction threads for processing, and at the same time, the overall rate or level of interleaving between the instruction threads is maintained at a desired rate or level (for example, see Japanese Patent No. 4086809).

There is also a known computer apparatus including a branch prediction mechanism that can predict an instruction to be executed after a conditional branch instruction to read a sequence of the instruction in advance, the branch prediction apparatus including, in addition to the branch prediction mechanism: means for obtaining a hint of a conditional branch direction; means for acquiring a hint of the conditional branch direction from an execution result of a specific instruction; means for transmitting the hint to the branch prediction apparatus; and means for determining the branch direction according to the hint (for example, see Japanese Laid-open Patent Publication No. 2001-5665).

There is also a known scheduling method in a multithreading processor, wherein a plurality of executable threads are allocated, the number of threads to be executed is dynamically determined according to an operational state of the multithreading processor, the determined number of threads are selected from the plurality of allocated threads, and instructions of the threads selected within the same period are fetched and executed (for example, see International Publication Pamphlet No. WO 04/044745).

Patent Literature 1: Japanese Laid-open Patent Publication No. 6-89173
Patent Literature 2: Japanese Patent No. 4179555
Patent Literature 3: Japanese Patent No. 4086808
Patent Literature 4: Japanese Patent No. 4086809
Patent Literature 5: Japanese Laid-open Patent Publication No. 2001-5665
Patent Document 6: International Publication Pamphlet No. WO 04/044745

Problems of latency will be described. In the pipeline processor that fetches instructions in each thread in a time division manner, the latency from the start of instruction fetch of a thread to acquisition of a result of branch prediction and timing of thread switching in a time division manner may not match. The mismatch in the timing of thread switching occurs when even if a branch prediction result of a thread is acquired, a pipeline stage for receiving the branch prediction result to fetch the instruction is processing another thread. If the pipeline stage is processing another thread, the branch prediction result is not immediately used, and the branch prediction latency is further extended. The number of execution cycles of the thread may increase due to the extension of the branch prediction latency. For example, if thread scheduling of a pure round-robin system is used and if the number of cycles of the branch prediction latency is not a multiple of the number of hardware threads, the number of cycles until the branch prediction result is used for the next instruction fetch is greater than when a single-thread operation is performed, due to the execution of the hardware multithreading operation.

Problems of throughput will be described. The processor core that schedules the threads by the conventional system without the forecast of the branch direction cannot conceal all branch prediction latency by hardware multithreading if the number of cycles (branch prediction latency) from the start of the instruction fetch to the acquisition of the branch prediction result is greater than the number of threads handled by the hardware. Therefore, the branch prediction result obtained by the dynamic branch predictor cannot be immediately used for the instruction fetch, and the pipeline is stalled. Or low-latent, but inaccurate static branch prediction needs to be used, instead of the dynamic branch predictor. The use of the inaccurate branch prediction increases the possibility of unnecessary instruction fetch and reduces the instruction fetch throughput. The reduction in the instruction fetch throughput may also reduce the instruction execution efficiency of the entire processor. In the multithread processor that uses the static branch prediction control for fetching (assumed "not branched") the subsequent instruction with a consecutive address in case the completion of the dynamic branch prediction is late, the throughput of the instruction fetch pipeline is wasted if the actual execution result of the branch instruction is "branched" when the prediction indicates "not branched". If the predicted branch direction is branched, the subsequent instruction of the next address is not executed even if the subsequent instruction is fetched. The pipeline processing of the subsequent instruction is canceled to fetch the predicted branch target instruction again, and this is always wasteful. As a result, the throughput performance is reduced in the multithread processor, and the power is wasted.

The processor usually includes storage resources, such as a cache, a TLB (Translation Lookaside Buffer), and a branch history table, the content of which is stored based on the instruction fetch history. The content of the storage resources may be contaminated by inaccurate instruction fetch, and the performance of the processor may be reduced.

SUMMARY

Provided is a processor that executes instructions of a plurality of threads in each of a plurality of cycle stages, the processor including: first selectors that select input instruction addresses of instructions of a plurality of threads or a branch target address of a branch instruction to be predicted and that output addresses of the plurality of threads; a second selector that selects one of the addresses of the plurality of threads output by the first selectors; a branch prediction circuit that predicts and outputs a branch direction, which indicates whether the branch instruction of the address selected by the second selector is branched, based on the selected address in a first cycle stage of the plurality of cycle stages and that predicts and outputs the branch target address of the branch instruction to be predicted based on the selected address in a second cycle stage later than the first cycle stage; and a thread arbitration circuit that controls selection of the addresses of the threads by the first selectors and the second selector based on the branch direction output by the branch prediction circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 depicts another example of configuration of the thread arbitration circuit of FIG. 5.

DESCRIPTION OF EMBODIMENTS

Figure 1:
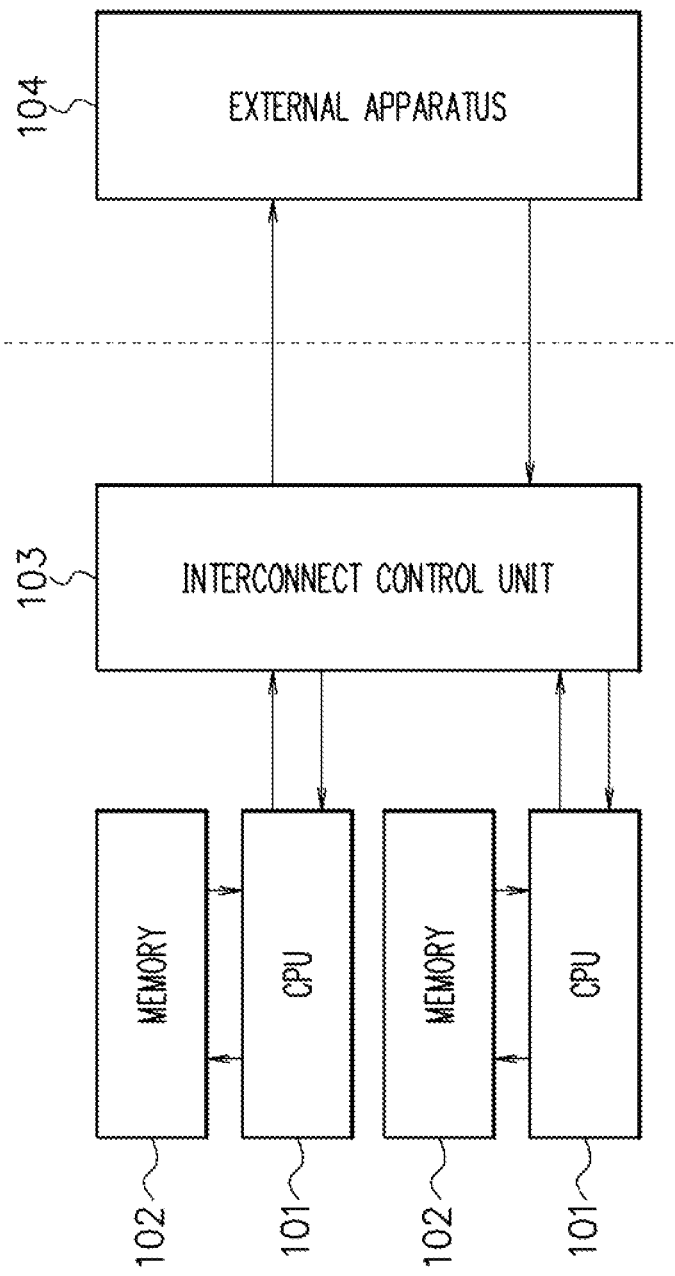
FIG. 1 depicts an example of configuration of an information processing apparatus according to an embodiment.

FIG. 1 depicts an example of configuration of an information processing apparatus according to an embodiment. The information processing apparatus is, for example, a system including multithreaded CPUs (Central Processing Units) 101 incorporated into a server or the like. The information processing apparatus includes a plurality of CPUs 101, a plurality of memories 102, and an interconnect control unit 103. The CPUs 101 are, for example, CPUs connected to the interconnect control unit 103. The plurality of memories 102 are connected to the plurality of CPUs 101, respectively. The interconnect control unit 103 controls input and output for an external apparatus 104.

Figure 2:
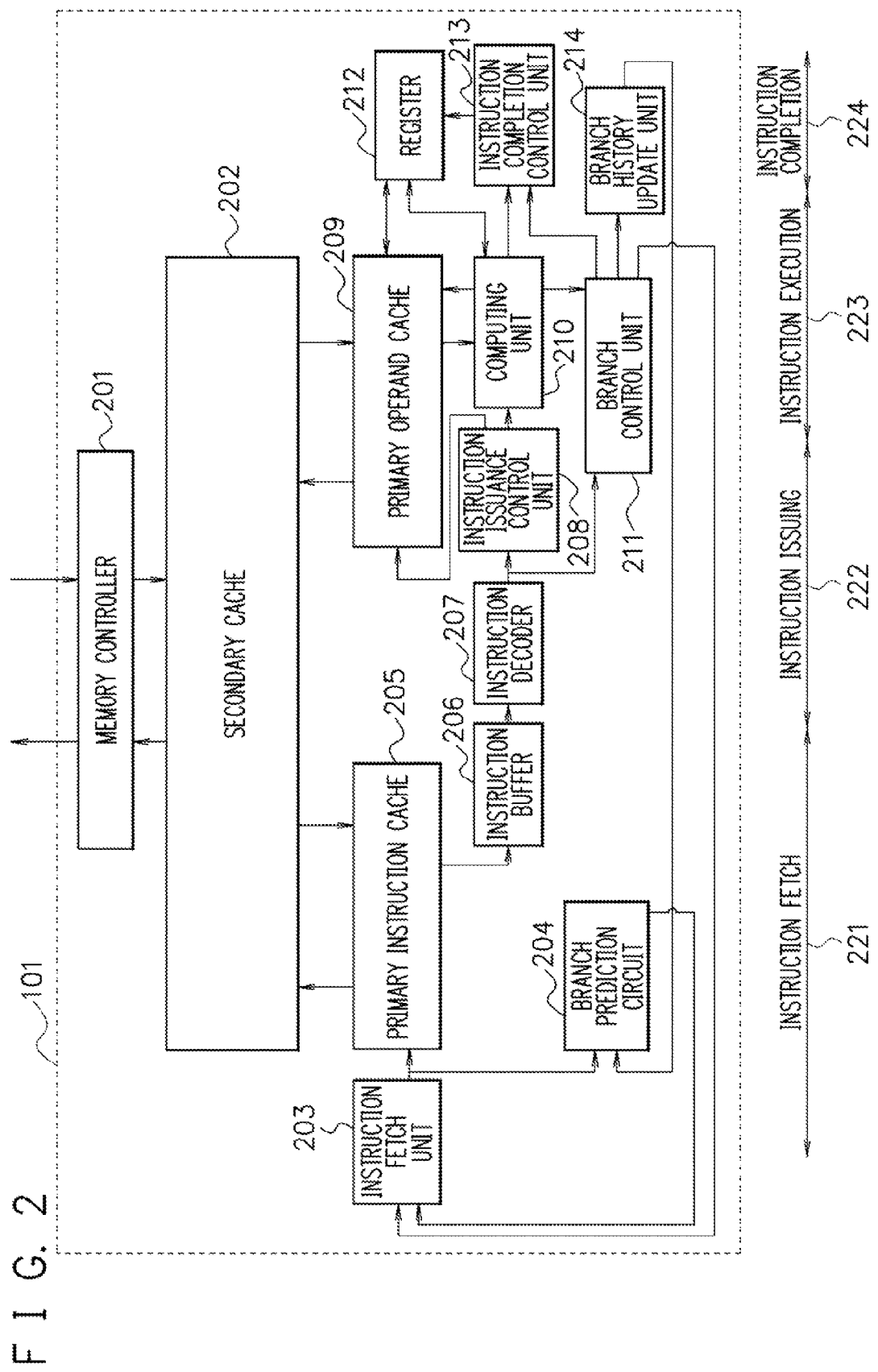
FIG. 2 depicts an example of configuration of a processor.

FIG. 2 depicts an example of configuration of the CPU 101. The CPU 101 has out-of-order execution and pipeline functions. An instruction fetch unit 203, an instruction buffer 206, a branch prediction circuit 204, a primary instruction cache 205, a secondary cache 202, and the like operate in an instruction fetch stage 221.

The instruction fetch unit 203 determines a next instruction fetch address by selecting one of a predicted branch target address of an instruction to be fetched input from the branch prediction circuit 204, a branch target address determined by a branch operation input from a branch control unit 211, and a consecutive next address of an instruction to be fetched in a case of "not branched" generated in the instruction fetch unit 203. The instruction fetch unit 203 outputs the determined instruction fetch address to the primary instruction cache 205 and fetches an instruction code from the address. The primary instruction cache 205 stores part of the information of the secondary cache 202, and the secondary cache 202 stores part of the information of the memory 102 (FIG. 1). The data is fetched from the secondary cache 202 if the primary instruction cache 205 does not include the data of the address, and the data is fetched from the memory 102 if the secondary cache 202 does not include the data. The memory 102 is arranged outside of the CPU 101 in the present embodiment. Therefore, the control of the input and output to and from the external memory 102 is performed through a memory controller 201. The instruction code fetched from the address in the primary instruction cache 205, the secondary cache 202, or the memory 102 is stored in the instruction buffer 206.

The branch prediction circuit 204 executes branch prediction in parallel with the instruction fetch. The branch prediction circuit 204 imports the instruction fetch address output from the instruction fetch unit 203 to perform branch prediction based on the instruction fetch address and outputs a branch direction indicating "branched" or "not branched" and a branch target address to the instruction fetch unit 203. If the predicted branch direction indicates "branched", the instruction fetch unit 203 selects the predicted branch target address as the next instruction fetch address. If a branch direction of "not branched" is predicted, the consecutive next address is selected as the instruction fetch address.

An instruction decoder 207 and an instruction issuance control unit 208 operate in an instruction issuing stage 222. The instruction decoder 207 receives the instruction code from the instruction buffer 206 to analyze the type of the instruction, necessary execution resources, and the like and outputs the analysis result to the instruction issuance control unit 208. The instruction issuance control unit 208 has a structure of a reservation station. The instruction issuance control unit 208 observes dependency of a register or the like referenced by the instruction to determine whether execution resources can execute the instruction based on the update status of a dependent register or based on the execution status of an instruction using the execution resources such as the same computing unit. If the execution resources can execute the instruction, the instruction issuance control unit 208 outputs information necessary to execute the instruction, such as a register number and an operand address, to a primary operand cache 209 and a computing unit 210 for each execution resource. The instruction issuance control unit 208 also serves as a buffer that stores the instruction until the instruction can be executed.

Execution resources, such as the computing unit 210, the primary operand cache 209, and the branch control unit 211, operate in an instruction execution stage 223. The computing unit 210 imports data from a register 212 or the primary operand cache 209 as necessary to execute operations corresponding to the instruction, such as four arithmetic operations, a logical operation, a trigonometric function operation, and address calculation, and outputs the operation result to the register 212 or the cache 209. Like the primary instruction cache 205, the primary operand cache 209 stores part of the information of the secondary cache 202. The primary operand cache 209 loads data from the memory 102 (FIG. 1) to the computing unit 210 or the register 212 based on a load instruction and stores data from the computing unit 210 or the register 212 to the memory 102 based on a store instruction. The execution resources output a notification of the completion of the execution of the instruction to an instruction completion control unit 213.

The branch control unit 211 imports the type of the branch instruction from the instruction decoder 207 and imports the result of the operation, which serves as the branch target address and the branch condition, from the computing unit 210. The branch control unit 211 determines "branched" if the operation result satisfies the branch condition and "not branched" if the operation result does not satisfy the branch condition and determines the branch direction. The branch control unit 211 also determines whether the branch target addresses and the branch directions match in the operation result and in the branch prediction and controls the order of the branch instructions. The branch control unit 211 outputs a notification of the completion of the branch instruction to the instruction completion control unit 213 if the operation result and the prediction match. The mismatch of the operation result and the prediction denotes a failure of the branch prediction. Therefore, the branch control unit 211 outputs a request for canceling a subsequent instruction and for re-instruction fetch to the instruction completion control unit 213 along with a notification of the completion of the branch instruction.

The instruction completion control unit 213, the register 212, and a branch history update unit 214 operate in an instruction completion stage 224. Based on the notification of the completion input from the instruction execution resources, the instruction completion control unit 213 executes an instruction completion process in the order of instruction codes stored in commit stack entries and outputs an update instruction of the register 212. When the register update instruction is input from the instruction completion control unit 213, the register 212 updates the register 212 based on the data of the operation result input from the computing unit 210 or the primary operand cache 209. Based on the result of the branch operation input from the branch control unit 211, the branch history update unit 214 generates history update data of the branch prediction circuit 204 and outputs the history update data to the branch prediction circuit 204 to update the history data of the branch prediction circuit 204.

Figure 3:
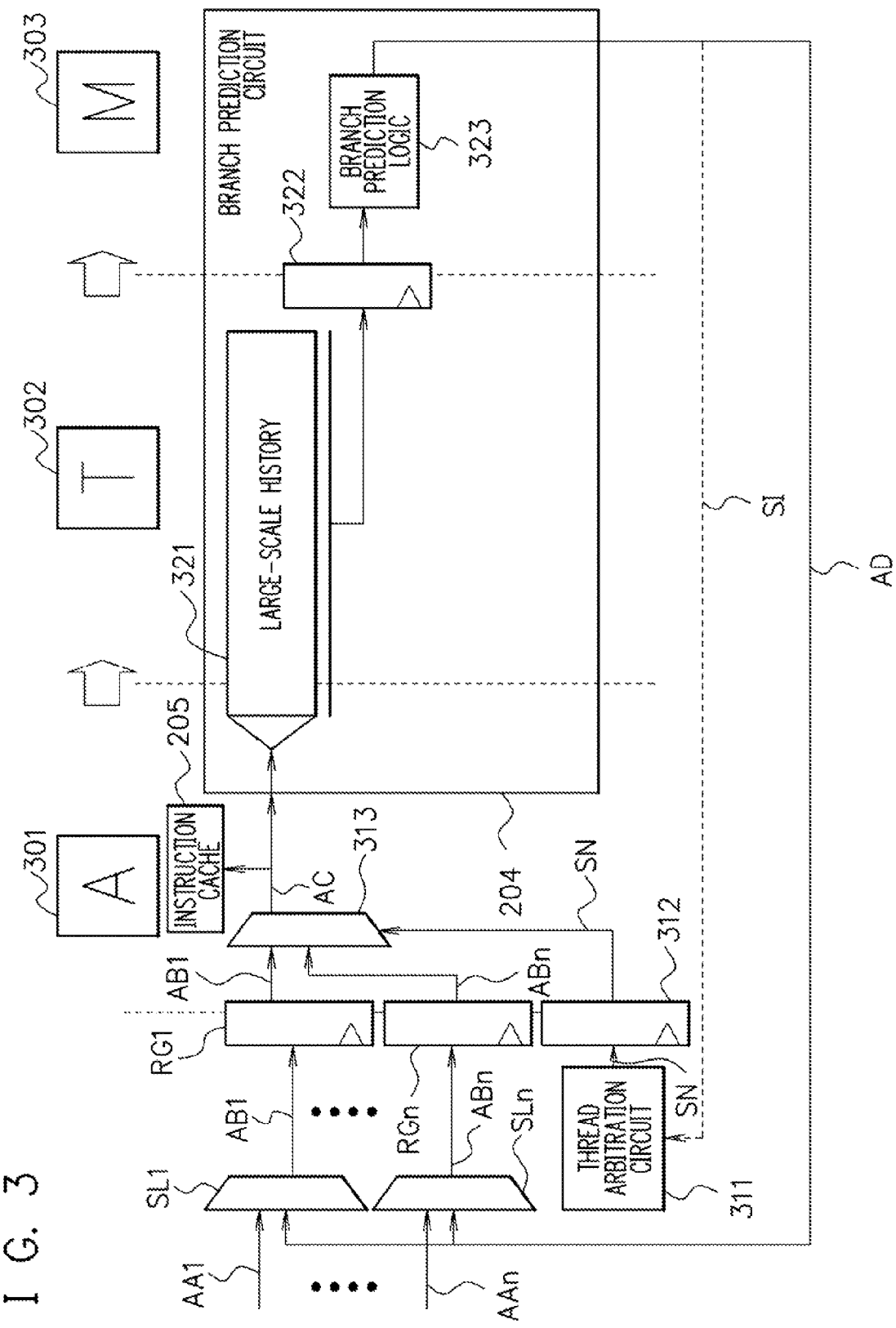
FIG. 3 depicts an example of configuration of an instruction fetch unit and a branch prediction circuit according to a referenced technique.

FIG. 3 depicts an example of configuration of the instruction fetch unit 203 and the branch prediction circuit 204 according to a referenced technique. The instruction fetch unit 203 includes first selectors SL1 to SLn, pipeline registers RG1 to RGn, a thread arbitration circuit 311, a pipeline register 312, and a second selector 313. The branch prediction circuit 204 includes a large-scale history table 321, a pipeline register 322, and a branch prediction logic circuit 323. The branch prediction is performed in the instruction fetch stage 221, based on pipeline processing. FIG. 3 depicts an example of an instruction fetch pipeline with branch prediction latency of three cycles: an A stage 301; a T stage 302, and an M stage 303. The instruction address is generated in the A stage 301. The history of the branch target address is read in the T stage 302. The completion process of the branch prediction is executed in the M stage 303. The number of steps of the pipeline in the instruction fetch stage 221, the positions of the pipeline registers, the functions of the pipeline stages, the number of hardware threads, and the like can be arbitrarily set.

Based on the control by the thread arbitration circuit 311, the n first electros SL1 to SLn select instruction addresses AA1 to AAn of n threads, respectively, or a branch target address AD and output addresses AB1 to ABn of n threads. In this case, n is an integer two or greater. For example, the selector SL1 imports the instruction address AA1 of a first thread and the branch target address AD and outputs the address AB1 of the first thread. The selector SL2 imports the instruction address AA2 of a second thread and the branch target address AD and outputs the address AB2 of the second thread. The n pipeline registers RG1 to RGn include flip-flops and latch and output the addresses AB1 to ABn of the n threads in synchronization with a clock signal. The thread arbitration circuit 311 outputs a thread number SN of an instruction to be fetched next, among the n threads. The pipeline register 312 latches and outputs the thread number SN in synchronization with the clock signal.

In the A stage 301, the second selector 313 selects and outputs an instruction address AC of a thread indicated by the thread number SN among the addresses AB1 to ABn of the n threads. The instruction address AC is an address for fetching and is output to the primary instruction cache 205. The instruction address AC is also output to the branch prediction circuit 204 through the pipeline register for use in the next branch prediction.

The branch prediction circuit 204 performs dynamic branch prediction in the T stage 302. Specifically, the large-scale history table 321 in the branch prediction circuit 204 stores history information of the branch direction and the branch target address with respect to the instruction address AC of the branch instruction and outputs the branch direction and the branch target address corresponding to the instruction address AC to the pipeline register 322. In exchange for high branch prediction accuracy, the large-scale history table 321 needs a long latency until the prediction result is obtained. The pipeline register 322 latches and outputs the branch direction and the branch target address in synchronization with the clock signal.

In the M stage 303, the branch prediction logic circuit 323 in the branch prediction circuit 204 imports the branch direction and the branch target address of the branch instruction from the pipeline register 322. The branch prediction logic circuit 323 outputs thread selection information SI to the thread arbitration circuit 311 and outputs the branch target address AD of the branch instruction to the first selectors SL1 to SLn. The thread selection information SI includes the branch direction and the thread number SN of the branch instruction.

Based on the control by the thread arbitration circuit 311, the first selectors SL1 to SLn select the branch target address AD if the branch direction in the thread selection information SI indicates "branched" and select the subsequent instruction addresses AA1 to AAn if the branch direction in the thread selection information SI indicates "not branched".

The thread arbitration circuit 311 outputs the thread number SN in the thread selection information SI to the pipeline register 312. The pipeline register 312 latches and outputs the thread number SN in synchronization with the clock signal. The second selector 313 selects one of the addresses AB1 to ABn according to the thread number SN output by the pipeline register 312 and outputs the address as the instruction address AC. For example, the second selector 313 selects the address AB1 of the first thread if the thread number SN is 1 and selects the address AB2 of the second thread if the thread number SN is 2.

Figure 4:
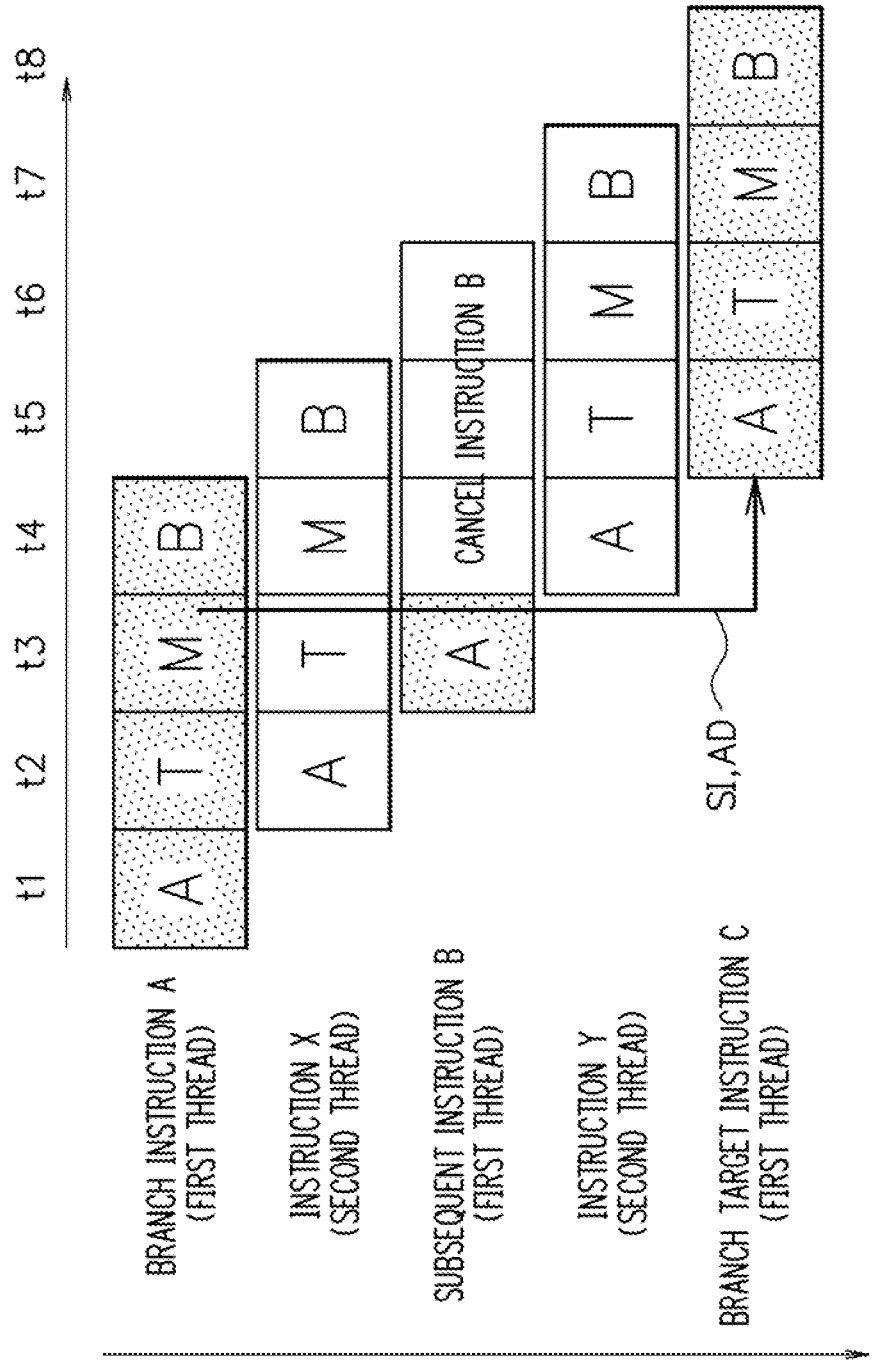
FIG. 4 depicts an example of pipeline processing of a processor of FIG. 3.

FIG. 4 depicts an example of pipeline processing of the CPU 101 of FIG. 3. FIG. 4 depicts an example in which the CPU 101 switches two threads (first thread and second thread) to fetch instructions, and the latency from the start of the fetch to the determination of the branch target address AD is three cycles. A right arrow indicates the time sequence, and a down arrow indicates the order of processing of the instructions.

The first thread includes a branch instruction A, a subsequent instruction B, and a branch target instruction C. The second thread includes an instruction X and an instruction Y. There is no control dependence relationship between the first thread and the second thread, and the threads can be freely selected without influencing the execution result, except for the influence on the performance. In the example, the instructions are alternately fetched from the first thread and the second thread. Specifically, the instructions are fetched in the order of the branch instruction A (first thread), the instruction X (second thread), the subsequent instruction B (first thread), the instruction Y (second thread), and the branch target instruction C (first thread).

The subsequent instruction B (first thread) is an instruction at the next address consecutive to the instruction address of the branch instruction A (first thread) and is an instruction executed in the cased of "not branched" based on the execution result of the branch instruction A (first thread). The branch target instruction C (first thread) is an instruction of the branch target address executed in the case of "branched" based on the execution result of the branch instruction A (first thread).

At a time t1, the A stage 301 of the focused branch instruction A is executed.

At a time t2, the T stage 302 of the branch instruction A is executed, and the A stage 301 of the instruction X is executed.

At a time t3, the M stage 303 of the branch instruction A is executed, the T stage 302 of the instruction X is executed, and the A stage 301 of the subsequent instruction B is executed. The thread selection information SI and the branch target address AD are determined in the M stage 303 of the branch instruction A, and the fetch of the branch target instruction C can be started in the A stage 301 at a time t5. An example of a case in which the thread selection information SI indicates "branched" will be described.

The branch target address AD is not determined at the time t3, and the branch target instruction C cannot be fetched. Therefore, at the time t3, the subsequent instruction B is fetched by static branch prediction which assumes "not branched".

At a time t4, the branch target prediction of the branch instruction A is completed at the end of the A stage 301 of the subsequent instruction B, and the branch target address AD is determined. Instead of the subsequent instruction B, the branch target instruction C is predicted to be the next instruction. Therefore, the subsequent instruction B is canceled at the time t4.

Canceling of the subsequent instruction B is prevented when the A stage 301 of the instruction Y of the second thread is executed at the time t3. However, there is no branch prediction result at the time of the A stage 301 of the subsequent instruction B. Therefore, canceling cannot be intentionally prevented by using the branch prediction result and scheduling the second thread.

The thread selection information SI indicates "branched" at the time t4. Therefore, the subsequent instruction B is canceled, and a B stage 304 (FIG. 8) of the branch instruction A is executed. The M stage 303 of the instruction X is executed, and the A stage 301 of the instruction Y is executed. The B stage 304 is a stage for transmitting the instruction to a later stage.

At the time t5, the B stage 304 of the instruction X is executed, the T stage 302 of the instruction Y is executed, and the A stage 301 of the branch target instruction C is executed.

At a time t6, the M stage 303 of the instruction Y is executed, and the T stage 302 of the branch target instruction C is executed.

At a time t7, the B stage 304 of the instruction Y is executed, and the M stage 303 of the branch target instruction C is executed.

At a time t8, the B stage 304 of the branch target instruction C is executed.

There is a prediction result of the branch target address AD at the time t4. Therefore, the A stage 301 of the branch target instruction C can be executed instead of the instruction Y. In that case, the A stage 301 of the instruction Y of the second thread is delayed, and the state of the instruction fetch of the first thread is adversely affected.

In the example, the branch target instruction C of the first thread is delayed in the scheduling result, instead of the instruction Y of the second thread. In either case, the third instruction slot from the top is consumed by the fetch of the subsequent instruction B, and the instruction fetch of one of the first thread and the second thread is delayed.

Figure 5:
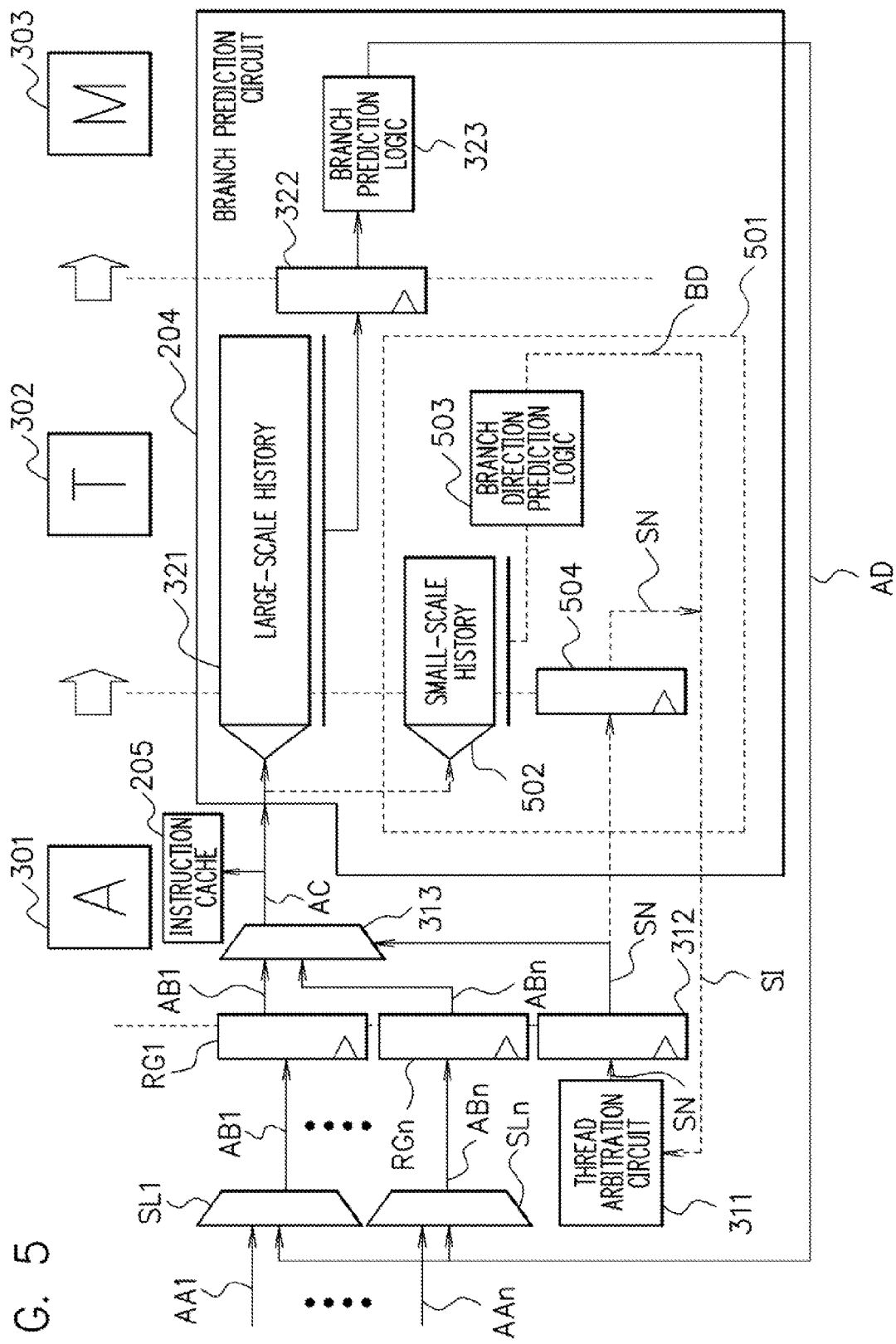
FIG. 5 depicts an example of configuration of an instruction fetch unit and a branch prediction circuit according to the present embodiment.

FIG. 5 depicts an example of configuration of the instruction fetch unit 203 and the branch prediction circuit 204 according to the present embodiment. In the CPU 101 of FIG. 5, a branch direction prediction circuit 501 is added to the CPU 101 of FIG. 3. Differences between the CPU 101 of FIG. 5 and the CPU 101 of FIG. 3 will be described.

The branch direction prediction circuit 501, which is arranged in the branch prediction circuit 204, includes a small-scale history table 502, a branch direction prediction logic circuit 503, and a pipeline register 504. In the T stage 302, the small-scale history table 502 stores the history information of the branch direction relative to the instruction address AC of a representative part of the branch instruction and outputs the branch direction corresponding to the instruction address AC to the branch direction prediction logic circuit 503. The branch direction prediction logic circuit 503 outputs a branch direction BD based on the branch direction output by the small-scale history table 502. The pipeline register 504 latches and outputs the thread number SN output by the pipeline register 312 in synchronization with the clock signal. The thread selection information SI includes the branch direction BD output by the branch direction prediction logic circuit 503 and the thread number SN output by the flip-flop 504, and the thread selection information SI is input to the thread arbitration circuit 311. In the M stage 303, the branch prediction logic circuit 323 outputs the branch target address AD to the first selectors SL1 to SLn.

The result of the branch direction BD output by the branch direction prediction logic circuit 503 in the T stage 302 is obtained earlier than the branch target address AD output by the branch prediction logic circuit 323 in the M stage 303. The branch direction BD is input to the thread arbitration circuit 311 along with the thread number SN, and a thread for the next instruction fetch is determined. In this way, the thread of the branch instruction predicted to be branched may not be scheduled. Details will be described later with reference to FIG. 6.

In the present embodiment, the branch direction prediction circuit 501 with a lower latency than the branch prediction circuit 204 of FIG. 3 including the large-scale history table 321 is arranged. The small-scale history table 502 stores entries that store branch directions (branch targets) of a small number (one or more) of branch instructions. In this way, the latency in the branch direction prediction is reduced when an entry held by the small-scale history table 502 is hit, and the latency from the start of the fetch of the branch instruction to the reflection of the thread selection of the instruction fetch is reduced.

The branch history update unit 214 of FIG. 2 updates the small-scale history table 502 and the large-scale history table 321. The characteristics of the small-scale history table 502 and the large-scale history table 321 as storage elements are in a gain-and-loss relationship in terms of the element delay and the storage density. The delay time in the storage element of the small-scale history table 502 is shorter than the delay time in the storage element of the large-scale history table 321, but the storage density (data capacity relative to the amount of circuits) is lower. The delay in the large-scale history table 321 is greater than the delay in the small-scale history table 502, but the storage density is higher. The storage elements are optimally and selectively used to improve the performance and reduce the amount of circuits. The large-scale history table 321 is, for example, an SRAM and stores a large number of entries. The small-scale history table 502 is, for example, a latch circuit and stores a small number of entries (for example, one entry). The number of entries of the small-scale history table 502 is smaller than the number of entries of the large-scale history table 321. An example of configuration of the branch direction prediction circuit 501 will be described later with reference to FIGS. 9 and 10.

The prediction of the branch direction BD is completed prior to the completion of the prediction of the branch target address AD. If the predicted branch direction BD indicates "branched", the subsequent instruction of the next address is not executed even if the subsequent instruction is fetched. The pipeline processing is canceled (cancelation of instruction processing), and the predicted branch target instruction is fetched alternatively. Therefore, the fetch of the subsequent instruction is always wasteful. In this case, the branch target address AD is not predicted yet when the prediction of the branch direction BD is completed, and the branch target instruction cannot be fetched. Therefore, the thread arbitration circuit 311 schedules another thread to avoid canceling the instruction to improve the efficiency of the instruction fetch throughput. Details will be described below.

Figure 6:
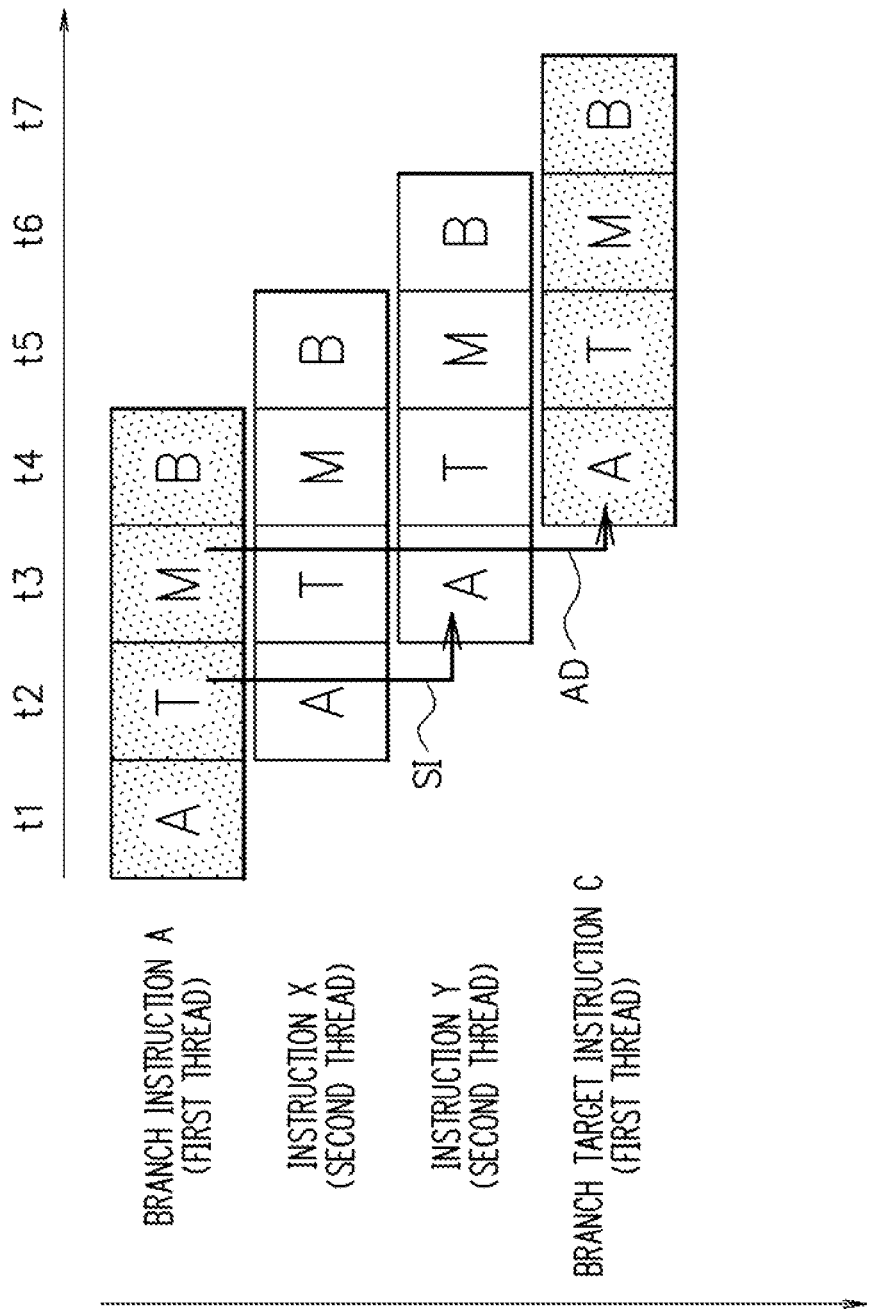
FIG. 6 depicts an example of pipeline processing of a processor of FIG. 5.

FIG. 6 depicts an example of pipeline processing of the CPU 101 of FIG. 5. Differences between FIG. 6 and FIG. 4 will be described. At the time t2, the instruction address AC hits the small-scale history table (branch direction prediction table) 502 in the T stage 302 of the branch instruction A, and the branch direction prediction logic circuit 503 outputs the branch direction BD indicating "branched". The thread selection information SI is input to the thread arbitration circuit 311. The thread selection information SI includes the branch direction BD and the thread number SN. In this case, the thread number SN indicates the number of the first thread including the instruction A.

At the time t3, the second selector 313 selects the instruction Y of the second thread indicated by the thread number SN based on the control by the thread arbitration circuit 311, and the A stage 301 of the instruction Y is executed. At the time t3, the M stage 303 of the branch instruction A is executed, and the branch prediction logic circuit 323 outputs the branch target address AD to the first selectors SL1 to SLn. The thread arbitration circuit 311 controls the first selectors SL1 to SLn to select the branch target address AD based on the branch direction BD indicating "branched".

At the time t4, the A stage 301 of the branch target instruction C is executed. Specifically, the thread arbitration circuit 311 controls the second selector 313 to select the address AB1 of the first thread including the branch instruction A based on the branch direction BD indicating "branched", and the A stage 301 of the branch target instruction C is executed. According to the present embodiment, the A stage 301 of the branch target instruction C at the time t4 can be executed just after the M stage 303 of the branch instruction A at the time t3. In this way, the latency in the instruction fetch of the branch target instruction C in FIG. 6 is shorter than that in FIG. 4.

The prediction result of the branch direction BD can be used to schedule the instruction X and the instruction Y of the second thread to avoid canceling the subsequent instruction B as illustrated in FIG. 4. Therefore, the instruction fetch time of the instruction Y of the second thread in FIG. 6 is earlier than that in FIG. 4.

The canceling of the subsequent instruction B is avoided, and the efficiency of the instruction fetch throughput is improved. Accordingly, the efficiency of the instruction fetch unit 203 improves in terms of both the instruction fetch latency and the instruction fetch throughput.

Figure 7:
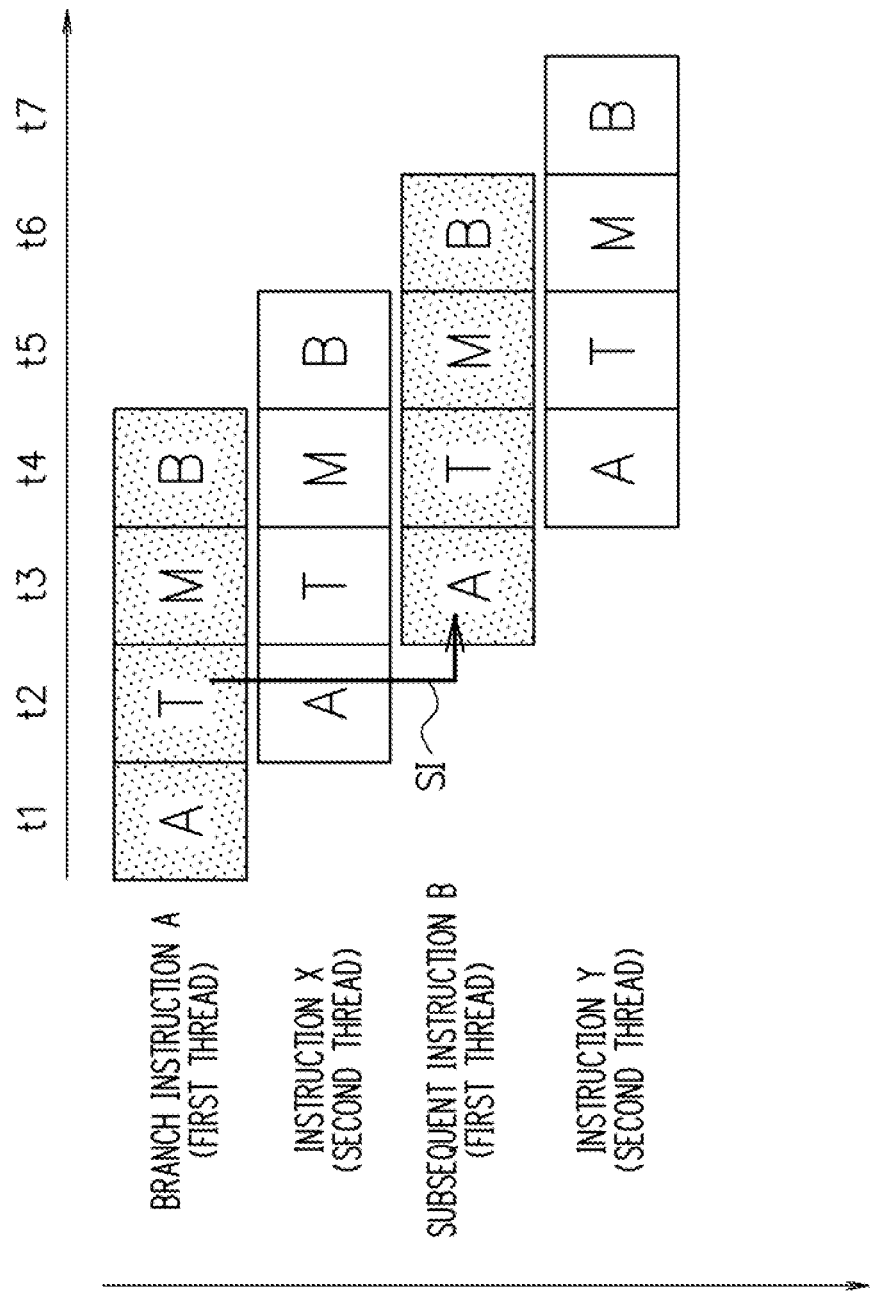
FIG. 7 depicts another example of pipeline processing of the processor of FIG. 5.

FIG. 7 depicts another example of pipeline processing of the CPU 101 of FIG. 5 and illustrates a case in which the branch direction BD indicates "not branched". Differences between FIG. 7 and FIG. 6 will be described. Basically, the second selector 313 alternately selects the first thread and the second thread based on the control by the thread arbitration circuit 311.

At the time t2, the instruction address AC does not hit the small-scale history table (branch direction prediction table) 502 in the T stage 302 of the branch instruction A, and the branch direction prediction logic circuit 503 outputs the branch direction BD indicating "not branched". The thread selection information SI is input to the thread arbitration circuit 311. The thread selection information SI includes the branch direction BD and the thread number SN.

At the time t3, the thread arbitration circuit 311 controls the second selector 313 to select the subsequent instruction B of the first thread based on the branch direction BD indicating "not branched", and the A stage 301 of the subsequent instruction B is executed. In the subsequent instruction B, the T stage 302 is executed at the time t4, the M stage 303 is executed at the time t5, and the B stage 304 is executed at the time t6.

At the time t4, the A stage 301 of the instruction Y of the second thread is executed. Specifically, the thread arbitration circuit 311 controls the second selector 313 to select the instruction Y of the second thread based on the branch direction BD indicating "not branched", and the A stage 301 of the instruction Y is executed. In the instruction Y, the T stage 302 is executed at the time t5, the M stage 303 is executed at the time t6, and the B stage 304 is executed at the time t7.

According to the present embodiment, efficient pipeline processing can be executed even if the branch direction BD indicating "not branched" is predicted.

As described, based on the address AC selected by the second selector 313, the branch prediction circuit 204 predicts the branch direction BD indicating whether the branch instruction is branched and outputs the branch direction BD in the T stage (first cycle stage) 302 when the instruction of the selected address AC is the branch instruction. The branch prediction circuit 204 predicts and outputs the branch target address AD of the branch instruction in the M stage (second cycle stage) 303 later than the T stage (first cycle stage) 302.

The branch prediction circuit 204 includes the large-scale history table (first history table) 321 that stores a branch history of past branch instructions and the small-scale history table (second history table) 502 that stores a branch history of past branch instructions. The branch prediction circuit 204 uses the large-scale history table 321 to predict the branch target address AD and uses the small-scale history table 502 to predict the branch direction B.

The thread arbitration circuit 311 controls the selection of the first selectors SL1 to SLn and the second selector 313 based on the branch direction BD output by the branch prediction circuit 204. The first selectors SL1 to SLn import the branch target address AD output by the branch prediction circuit 204.

The first selectors SL1 to SLn select the branch target address AD if the predicted branch direction BD indicates "branched" and select the instruction addresses AA1 to AAn of the n threads if the predicted branch direction BD indicates "not branched".

The second selector 313 selects the address of the instruction Y of the second thread different from the first thread including the branch instruction A if the predicted branch direction BD indicates "branched" (FIG. 6) and selects the address of the subsequent instruction B of the first thread that is the same as the first thread including the branch instruction A if the predicted branch direction BD indicates "not branched" (FIG. 7).

Figure 8:
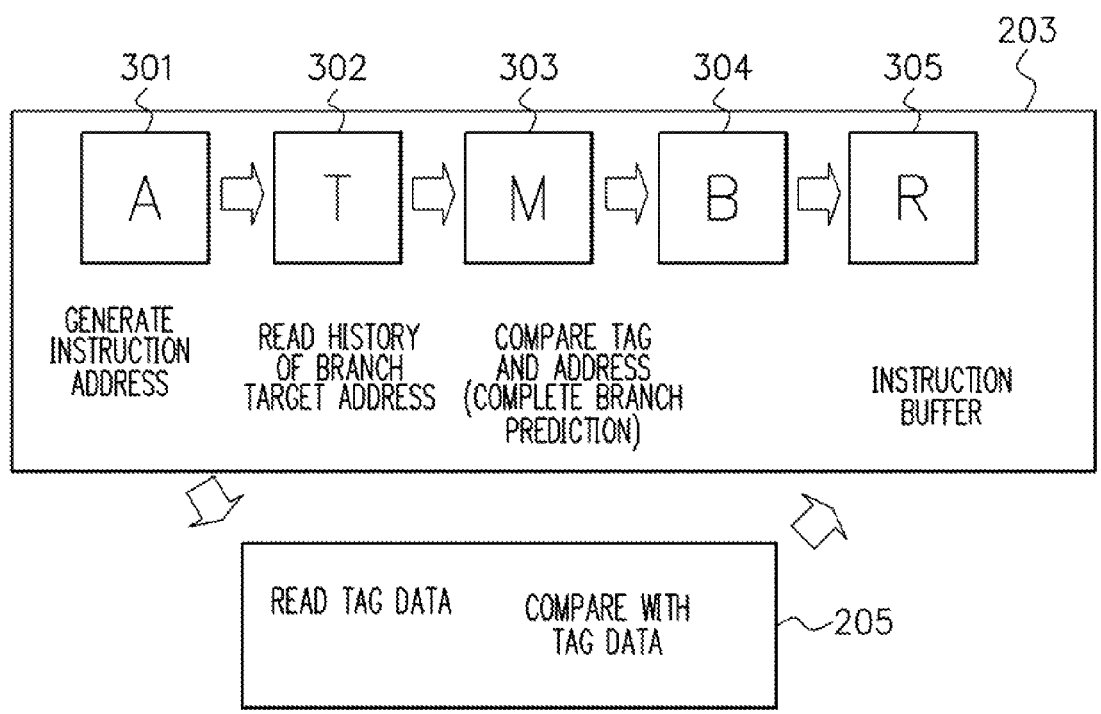
FIG. 8 depicts an example of configuration of the instruction fetch unit and a primary instruction cache.

FIG. 8 depicts an example of configuration of the instruction fetch unit 203 and the primary instruction cache 205. The instruction fetch unit 203 has a pipeline including the A stage 301, the T stage 302, the M stage 303, the B stage 304, and an R stage 305. The A stage 301 has a function of generating the instruction address. The T stage 302 has a function of reading the history of the branch target address. The M stage 303 has a function of completing the branch prediction. The B stage 304 has other functions of later stages of the instruction fetch pipeline (transmission process of instruction). The R stage 305 is a process of the instruction buffer. The primary instruction cache 205 uses the instruction address as an index to read tag data and compares the instruction address with the tag data to output the matched instruction to the instruction buffer 206.

In the present embodiment, the prediction of the branch direction BD is completed in the T stage 302, and the prediction of the branch target address AD is completed in the M stage 303. Efficient pipeline processing can be executed.

Figure 9:
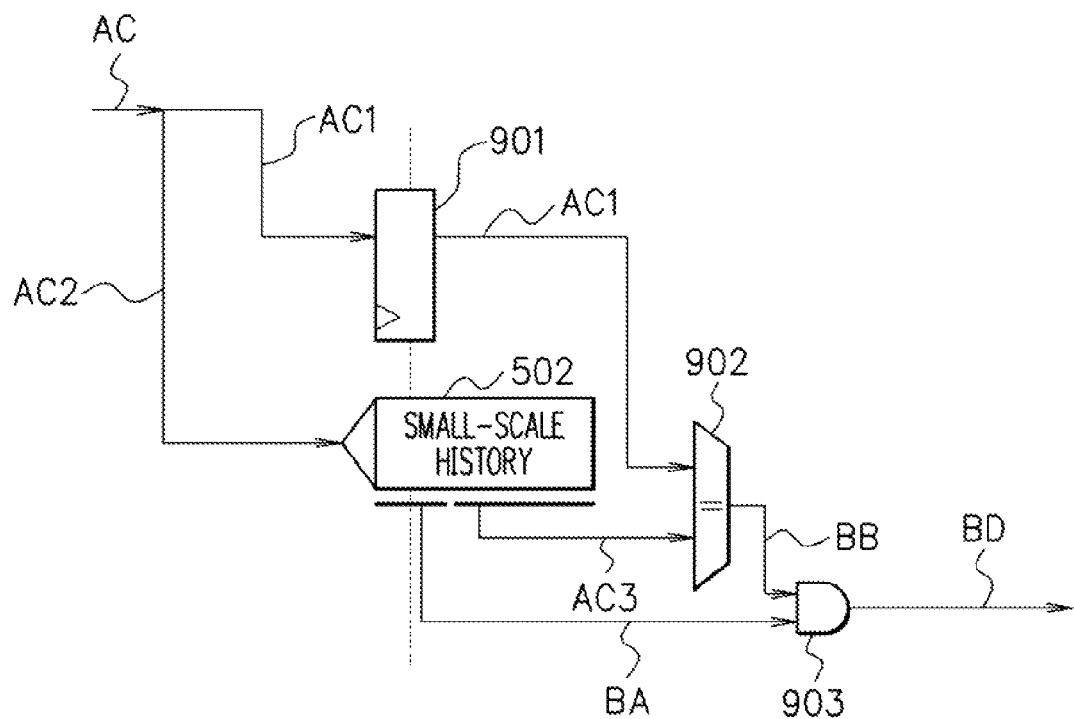
FIG. 9 depicts an example of configuration of the branch direction prediction circuit of FIG. 5.

FIG. 9 depicts an example of configuration of the branch direction prediction circuit 501 of FIG. 5. A comparator 902 and a logical product (AND) circuit 903 correspond to the branch direction prediction logic circuit 503 of FIG. 5. The instruction address AC is divided into a tag AC1 as a higher bit address and an index AC2 as a lower bit address. The pipeline register 901 latches and outputs the tag AC1 in synchronization with the clock signal. The small-scale history table (branch direction prediction table) 502 stores a small number of (one or more) entries and includes an element such as a low-latency latch circuit. The entries include a branch direction BA and a tag AC3 corresponding to the index AC2. The small-scale history table 502 imports the index AC2 and outputs the branch direction BA and the tag AC3 corresponding to the index AC2. The comparison circuit 902 compares the tag AC1 output by the flip-flop 901 and the tag AC3 output by the small-scale history table 502. The comparison circuit 902 outputs "1" as a prediction effective signal BB if the tags AC1 and AC3 match (hit) and outputs "0" as the prediction effective signal BB if the tags AC1 and AC3 do not match (missed). The logical product circuit 903 outputs a logical product signal of the prediction effective signal BB and the branch direction BA as a branch direction BD. The branch direction BD is the same as the branch direction BA if the prediction effective signal BB is "1", and the branch direction BD is "0" if the prediction effective signal BB is "0". In the branch direction BD, "1" indicates "branched", and "0" indicates "not branched".

Other than the branch instruction, the branch prediction circuit 204 can also predict other instructions. In that case, the branch prediction circuit 204 also predicts whether the instruction is a branch instruction, and the instruction decoder 207 in a later stage determines whether the instruction is a branch instruction.

The storage element of the high-latency large-scale history table 321 is, for example, a RAM (Random Access Memory) as a high-density element. The storage element of the low-latency small-scale history table 502 can be a storage element using an element with lower latency than the large-scale history table 321. Examples of the storage element of the small-scale history table 502 include, without limitation, a latch circuit and a flip-flop. The low-latency branch direction prediction circuit 501 may include a CAM (Content Addressable Memory).

The small-scale history table 502 may be a direct map, may be set-associative, or may be full-associative. The number of entries can be one or more. There are no restrictions on the bit width of the index of the small-scale history table 502. The index can be a function of the instruction address. For example, an arbitrary hash of the instruction address may be the index. The bit width of the tag AC 1 may be reduced in exchange for the prediction accuracy.

In addition to the low-latency branch direction prediction circuit 501, the branch prediction circuit 204 may include a branch direction prediction circuit with high prediction accuracy.

Figure 10:
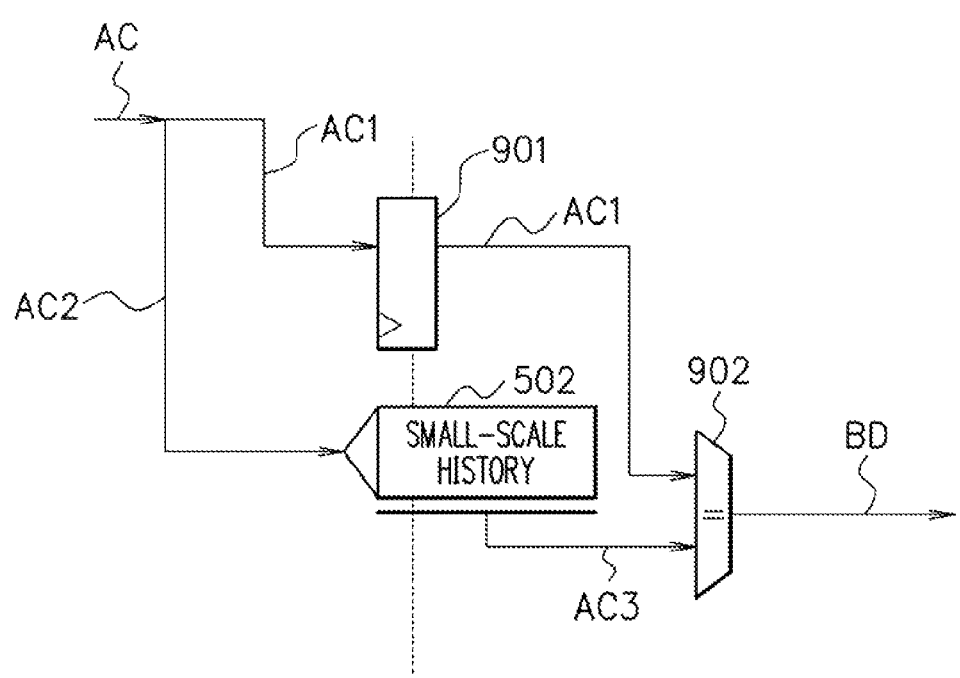
FIG. 10 depicts another example of configuration of the branch direction prediction circuit of FIG. 5.

FIG. 10 depicts another example of configuration of the branch direction prediction circuit 501 of FIG. 5. In the branch direction prediction circuit 501 of FIG. 10, the logical product circuit 903 is deleted from the branch direction prediction circuit 501 of FIG. 9. Differences between FIG. 10 and FIG. 9 will be described. The small-scale history table 502 omits the branch direction BA and stores an entry corresponding to only the branch instruction predicted to be branched. The small-scale history table 502 outputs the tag AC3 corresponding to the index AC2. The comparison circuit 902 compares the tags AC1 and AC3. The comparison circuit 902 outputs the branch direction BD of "1" if the tags AC1 and AC3 match and outputs the branch direction BD of "0" if the tags AC1 and AC3 do not match.

Figure 11:
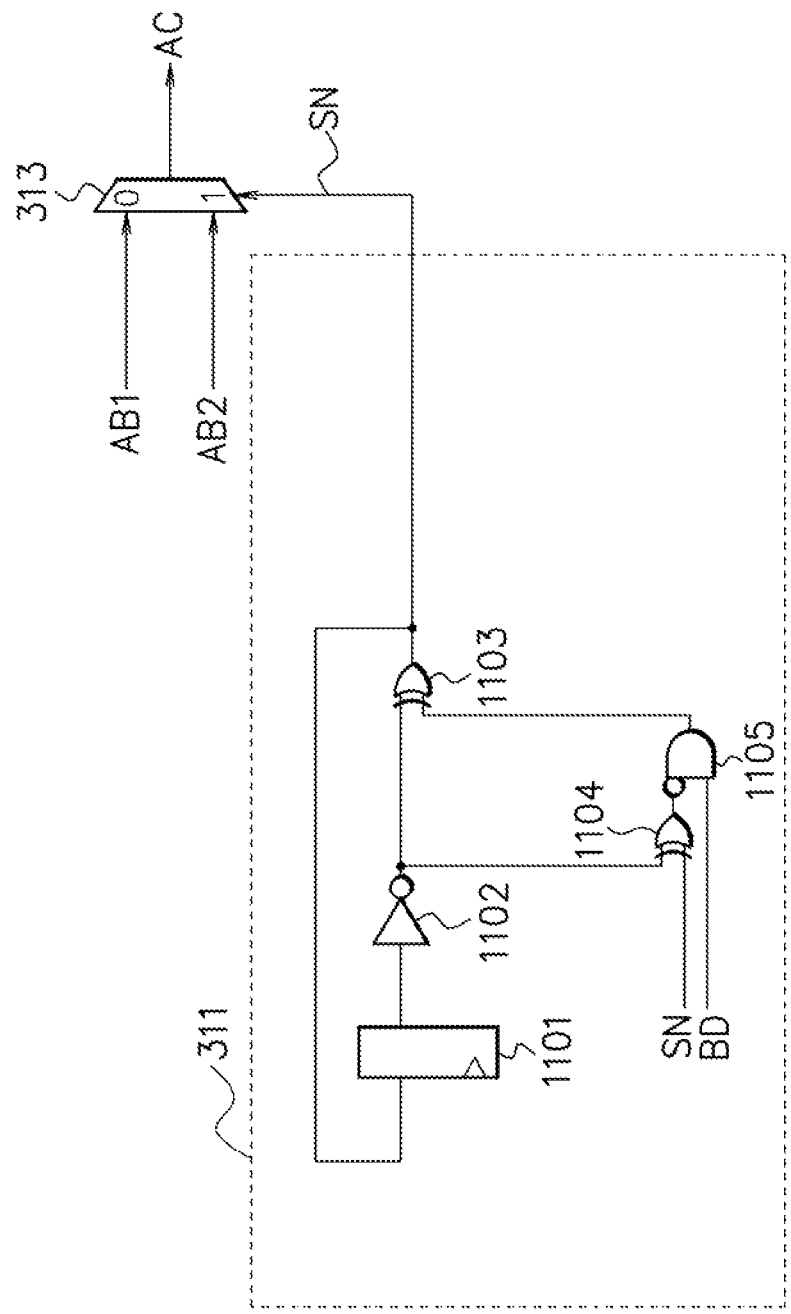
FIG. 11 depicts an example of configuration of a thread arbitration circuit of FIG. 5.

FIG. 11 depicts an example of configuration of the thread arbitration circuit 311 of FIG. 5. FIG. 11 depicts an example of arbitrating two threads, the first thread and the second thread. As for the thread number SN, "0" indicates the first thread, and "1" indicates the second thread. An exclusive OR circuit 1104 outputs an exclusive OR signal of an output signal of an inverter 1102 and the thread number SN. A logical product circuit 1105 outputs a logical product signal of a logically inverted signal of the output signal of the exclusive OR circuit 1104 and the branch direction BD. A latch circuit 1101 latches and outputs the output signal of an exclusive OR circuit 1103 in synchronization with the clock signal. The inverter 1102 outputs a logically inverted signal of the output signal of the flip-flop 1101. The exclusive OR circuit 1103 outputs, as the thread number SN, an exclusive OR signal of the output signal of the inverter 1102 and the output signal of the logical product circuit 1105 to the second selector 313. The second selector selects the address AB1 of the first thread if the thread number SN is "0" and selects the address AB2 of the second thread if the thread number SN is "1". The second selector outputs the address AC.

A case in which the branch direction BD indicates "not branched" as illustrated in FIG. 7 will be described. In this case, the branch direction BD is "0", and the logical product circuit 1105 outputs "0". Consequently, the exclusive OR circuit 1103 outputs the output signal of the inverter 1102 without change. For example, if the output signal of the flip-flop 1101 is "1", the inverter 1102 outputs a signal of "0", and the exclusive OR circuit 1103 outputs the thread number SN of "0" to the second selector 313. Since the thread number SN is "0", the second selector 313 selects the address AB1 of the first thread and outputs the address AB1 as the instruction address AC.

The flip-flop 1101 imports the thread number SN of "0" from the exclusive OR circuit 1103 and outputs a signal of "0". Consequently, the inverter 1102 outputs a signal of "1", and the exclusive OR circuit 1103 outputs the thread number SN of "1" to the second selector 313. Since the thread number SN is "1", the second selector 313 selects the address AB2 of the second thread and outputs the address AB2 as the instruction address AC.

Similarly, the second selector 313 alternately selects and outputs the address AB1 of the first thread and the address AB2 of the second thread.

A case in which the branch direction BD indicates "branched" as illustrated in FIG. 6 will be described. In this case, the branch direction BD is "1", and the thread number SN is "0" indicating the first thread including the branch instruction A. For example, the A stage 301 of the instruction X is executed at the time t2 of FIG. 6. Since the instruction X is in the second thread, the inverter 1102 outputs a signal of "0". Consequently, the exclusive OR circuit 1104 outputs a signal of "0" as an exclusive OR signal of the thread number SN of "0" and the output signal of "0" of the inverter 1102, and the logical product circuit 1105 outputs a signal of "1". The exclusive OR circuit 1103 outputs, as the thread number SN, a logically inverted signal of the output signal of the inverter 1102. In this case, since the output signal of the inverter 1102 is "0", the thread number SN is "1". Since the thread number SN is "1", the second selector 313 selects the address AB2 of the second thread and outputs the address AB2 as the instruction address AC. As a result, the A stage 301 of the instruction Y of the second thread is executed at the time t3 of FIG. 6.

FIG. 12 depicts another example of configuration of the thread arbitration circuit 311 of FIG. 5, and two or more threads can be arbitrated. The thread arbitration circuit 311 includes n priority encoders PE1 to PEn, a scheduler 1201, and a selector 1202. The thread selection information SI includes the branch direction BD and the thread number SN. Each of the n priority encoders PE1 to PEn outputs the number of threads that allows fetching among the n threads in accordance with the priorities based on the thread selection information SI. The priorities of the n priority encoders PE1 to PEn are different. For example, the priority of the first thread is the highest for the first priority encoder PE1, and the priority of the n-th thread is the highest for the n-th priority encoder PEn. The selector 1202 selects and outputs one of the output signals of the n priority encoders PE1 to PEn based on the control by the scheduler 1201. The scheduler 1201 can control the selector 1202 to uniformly select the output singles of the n priority encoders PE1 to PEn to prevent specific threads from being selected too many times. The scheduler 1201 may control the selector 1202 to prioritize and select one of the threads based on an arbitrary scheduling policy.

The instruction buffer 206 may or may not exist between the instruction fetch unit 203 and the instruction decoder 207. The instruction fetch unit 203 can be an apparatus that is pipelined and that controls the instruction fetch based on the instruction code and based on the branch prediction circuit 204 in a time division manner with cycle granularity for a plurality of threads. The instruction fetch unit 203 may be configured to simultaneously fetch a plurality of instructions of the same thread at the same cycle.

There are no restrictions on the number of steps of the pipeline, and there are no restrictions on the branch prediction latency. The configuration method of the pipeline can be synchronous or asynchronous, and a wave pipeline may be formed.

The CPU may include a plurality of instruction fetch units 203 per core. More specifically, the circuits in later stages than the instruction fetch unit 203 may be shared by another instruction fetch units 203. In other words, the entire apparatus in conjunction with the plurality of instruction fetch units 203 may control the instruction fetch for the plurality of threads in the same cycle.

The number of hardware threads may be two or more. There are no restrictions on the basic thread scheduling system. Even in a scheduling system other than the round-robin system, unnecessary instruction fetch can be prevented by predicting the branch direction prior to the instruction fetch.

There are no restrictions on the instruction set architecture implemented by the CPU 101. The instruction set architecture may be an RISC (Reduced Instruction Set Computer) architecture, a CISC (Complex Instruction Set Computer) architecture, or a VLIW (Very Long Instruction Word) architecture.

There are no restrictions on the format of the instruction decoder 207. The instruction decoder 207 may be a sequencing architecture, a superscalar architecture, or a VLIW architecture. The instruction decoder 207 may convert to codes statically or dynamically.

There are no restrictions on the form of the instruction execution unit. The instruction execution unit may be a single cycle execution unit, a pipeline control unit, a sequencing unit, a superscalar execution unit, an out-of-order execution unit, or an in-order execution unit. The control of the computing unit may be an SIMD (Single Instruction Multiple Data) type or may be in a form of controlling operation resources outside of the processor core. There are no restrictions on the format of the completion of the instruction, and speculative execution or accurate interrupt may or may not be realized.

As described, according to the present embodiment, the branch direction BD is predicted prior to the prediction of the branch target address AD. Therefore, efficient thread selection is possible, and the processing speed can be improved.

The embodiment is intended to illustrate examples for implementing the present embodiment and may not be construed as limiting the technical scope of the present embodiment. The present embodiment can be implemented in various forms without departing from the technical spirit and main characteristics of the present embodiment.

Efficient thread selection is possible in a CPU.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A processor that executes instructions of a plurality of threads in each of a plurality of cycle stages, the processor comprising:
    first selectors that select input instruction addresses of instructions of a plurality of threads or a branch target address of a branch instruction to be predicted and that output addresses of the plurality of threads;
    a second selector that selects one of the addresses of the plurality of threads output by the first selectors;
    a branch prediction circuit that predicts and outputs a branch direction, which indicates whether the branch instruction of the address selected by the second selector is branched, based on the selected address in a first cycle stage of the plurality of cycle stages and that predicts and outputs the branch target address of the branch instruction to be predicted based on the selected address in a second cycle stage later than the first cycle stage; and
    a thread arbitration circuit that controls selection of the addresses of the threads by the first selectors and the second selector based on the branch direction output by the branch prediction circuit.

2. The processor according to claim 1, wherein
the branch prediction circuit
uses a first history table, which stores a history of branch directions and branch target addresses of past branch instructions, to predict the branch target address of the branch instruction to be predicted and
uses a second history table, which stores a history of branch directions of past branch instructions, to predict the branch direction of the branch instruction to be predicted.

3. The processor according to claim 2, wherein the number of entries of the second history table is smaller than the number of entries of the first history table.

4. The processor according to claim 1, wherein the first selectors select the branch target address when the predicted branch direction indicates "branched" and select the instruction addresses of the instructions of the plurality of threads when the predicted branch direction indicates "not branched".

5. The processor according to claim 1, wherein the second selector selects the address of a thread different from the thread comprising the branch instruction among the plurality of threads when the predicted branch direction indicates "branched" and selects the address of the same thread as the thread comprising the branch instruction when the predicted branch instruction indicates "not branched".

6. A control method of a processor that executes instructions of a plurality of threads in each of a plurality of cycle stages, the control method comprising:

first selectors comprised in the processor selecting input instruction addresses of instructions of a plurality of threads or a branch target address of a branch instruction to be predicted and outputting addresses of the plurality of threads;

a second selector comprised in the processor selecting one of the addresses of the plurality of threads output by the first selectors; and a branch prediction circuit comprised in the processor predicting and outputting a branch direction, which indicates whether the branch instruction of the address selected by the second selector is branched, based on the selected address in a first cycle stage of the plurality of cycle stages and predicting and outputting the branch target address of the branch instruction to be predicted based on the selected address in a second cycle stage later than the first cycle stage among the plurality of cycle stages.

* * * * *